UNITED STATES PATENT OFFICE.

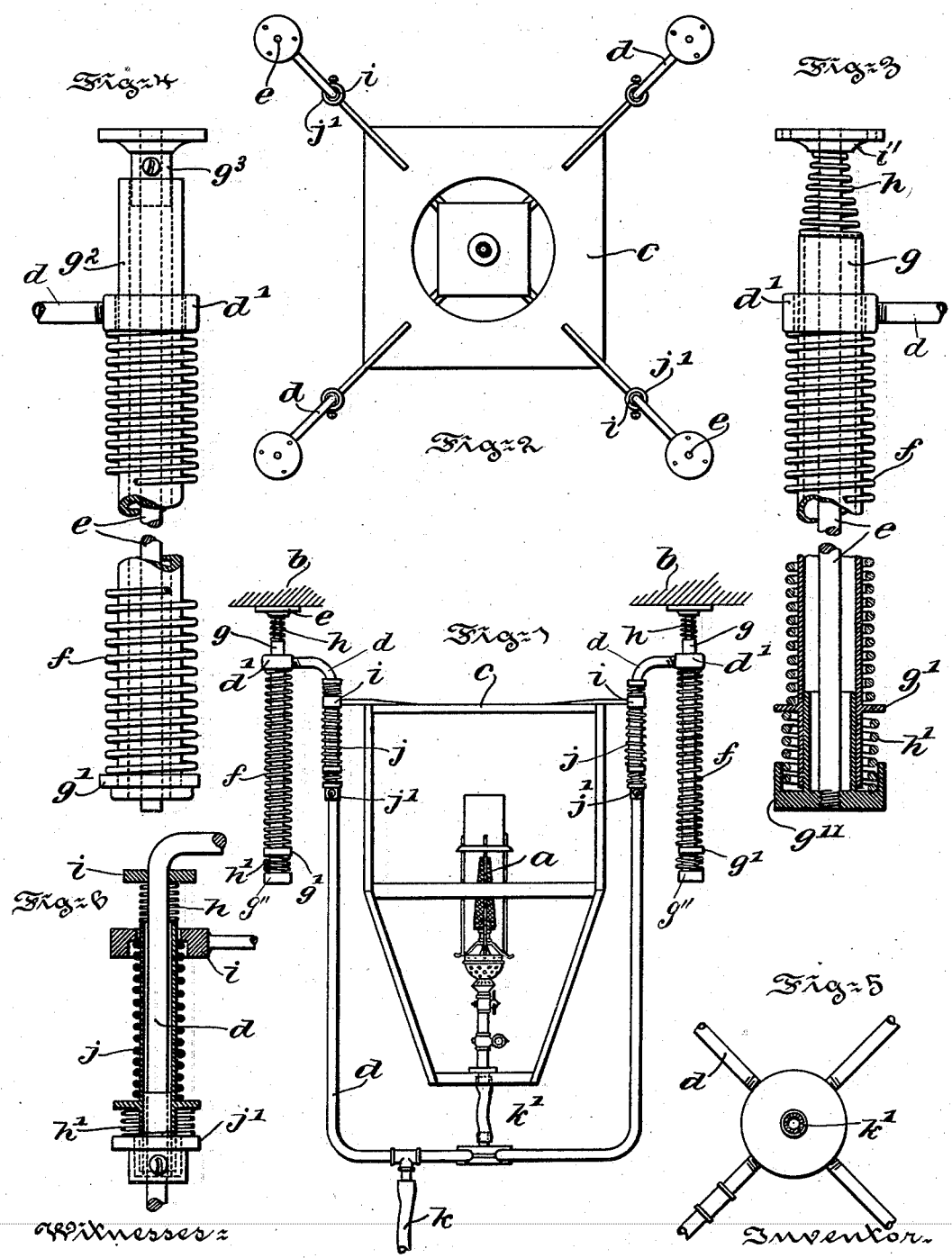

SIMEON E. FARRADAY, OF GLOUCESTER CITY, NEW JERSEY, ASSIGNOR TO THE WELSBACH LIGHT COMPANY, OF SAME PLACE.

INCANDESCENT-LIGHT FIXTURE FOR RAILWAY-CARS, &c.

SPECIFICATION forming part of Letters Patent No. 578,735, dated March 16, 1897.

Application filed July 22, 1896. Serial No. 600,112. (No model.)

*To all whom it may concern:*

Be it known that I, SIMEON E. FARRADAY, a citizen of the United States, residing at Gloucester City, in the county of Camden and State of New Jersey, have invented certain new and useful Improvements in Welsbach and other Incandescent-Gas-Light Fixtures for Railway-Cars and the Like, of which the following is a specification.

The objects of my invention are, first, to obtain in railway-cars and other structures subjected to vibrations the increased illuminating effect obtainable by the use of Welsbach and other mantles or incandescents which are comparatively fragile, and, second, to provide a simple, neat, attractive, durable, and reliable fixture for supporting and heating Welsbach and other incandescent mantles in such manner that the same are protected from breakage due to vibrations and shaking, such as occur in railway-cars and other localities.

My invention consists of the improvements hereinafter described and claimed.

The nature, characteristic features, and scope of my invention will be more fully understood from the following description, taken in connection with the accompanying drawings, forming part hereof, and in which—

Figure 1 is a side view of a fixture embodying features of my invention. Fig. 2 is a top or plan view of the same. Fig. 3 is a detached view drawn to an enlarged scale in order to illustrate the elastic support shown in Fig. 1. Fig. 4 is a similar view illustrating a modification of the elastic support shown in Fig. 3. Fig. 5 is a top or plan view of the base of the cradle, and Fig. 6 is a detached sectional view of the elastic support or connection that carries the part or parts which support the mantle or incandescent.

In the drawings, $a$ is the mantle, and $b$ a portion of the structure to be illuminated thereby. For example, $b$ may be a portion of the roof or ceiling of a railway-car, room, or store, or it may be a portion of a frame mounted upon a suitable post or other structure. The mantle $a$ is usually mounted upon a fixture, bracket, or the like, and for the sake of illustration I have shown it mounted on and carried by a lantern $c$.

$d$ is a cradle sustained by spring-supports, and the lantern $c$ is also sustained by spring-supports.

$e$ are ways, posts, or pillars, of which the number is not material, four being shown in the drawings as depending from the part $b$.

The cradle $d$ is provided with guides $d'$, that coöperate with these posts, ways, or pillars $e$. For the sake of explanation I have shown the parts $d'$ encircling the parts $e$ and supported by springs or elastic bodies $f$, which also encircle the parts $e$.

To insure freedom of motion, use may be made of sleeves $g$, loosely mounted on the parts $e$ and loosely fitted to the parts $d'$. Between the respective ends of the sleeves $g$ and of the parts $e$ are interposed springs $h$ and $h'$. These springs $h$ and $h'$ are at their outer ends seated upon caps $g''$ and $i'$, Fig. 3, formed on or attached to the part encircled by the springs $f$. Collars $g'$ on the sleeves support the lower ends of the springs $f$, and the upper ends of the springs $f$ carry the cradle $d$ through the intervention of the parts $d'$.

From the foregoing description it is apparent that the parts $d'$ are connected through the intervention of the springs $f$ with the sleeves $g$, and that the sleeves $g$ are supported by the springs $h$ and $h'$ and are therefore movable in respect to the parts $e$.

In the modification of my invention shown in Fig. 4 the sleeves $g^2$ are of rubber, and therefore by their elasticity are movable in respect to the parts $e$, so that in this construction the employment of the springs $h$ and $h'$ is dispensed with and the sleeves $g^2$ are connected to the parts $e$ at their tops, as is indicated at $g^3$.

$i$ are guides connected with the lantern or other carrier $c$ and adapted for coöperation with the arms of the cradle $d$. As shown, the guides $i$ encircle the arms in such manner that they are movable thereon.

$j$ are springs which support the lantern or carrier $c$ in respect to the cradle $d$ and which are shown as provided with sleeves and their accessories like those shown in Fig. 3 and hereinabove described. These springs $j$ support the parts $i$, and the collars $j'$ may be made adjustable in respect to the arms of the cradle by means of set-screws, as shown in Fig. 6.

Gas may be supplied for heating the mantle by way of suitable flexible gas connections.

$k$ is a flexible hose for conveying gas through one of the arms of the cradle, which may be made hollow for this purpose, and $k'$ is a flexible gas connection or hose for conveying gas from the cradle to the burner. These connections $k$ and $k'$ are sufficiently slack to afford the parts with which they are connected freedom of motion in all directions.

The mode of operation of my invention may be described in connection with the apparatus illustrated in the drawings as follows: Such shocks, jars, shaking, or vibrations as would tend to the injury or destruction of the mantle are taken up or compensated for not only by the spring-supports which carry the cradle and permit of its rocking in many directions with an easy motion, but also by the spring-supports which connect the carrier or lantern $c$ with the cradle and permit of its rocking with a similar easy motion in many directions. At the same time the flexible gas connections supply the necessary fuel for heating the mantle without interfering with the described action of the spring-supports, all of which afford the parts that carry the mantle ease and freedom of motion, whereby shaking, jars, and vibrations are taken up without injury to the mantle.

It will be obvious to those skilled in the art to which my invention appertains that modifications may be made in details without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. In combination a cradle, spring-supports for said cradle, a mantle-carrier, and spring-supports interposed between the cradle and mantle-carrier, substantially as described.

2. In combination ways, posts or pillars, collars at or near the ends thereof, a cradle provided with guides coöperating with said posts, ways or pillars, and spring-supports interposed between said guides and collars, substantially as described.

3. In combination ways, posts or pillars, a cradle provided with guides coöperating with said posts, ways or pillars, spring-supports interposed between said guides and posts, ways or pillars, a mantle-carrier provided with guides coöperating with ways on the cradle, and spring-supports interposed between the cradle and mantle-carrier, substantially as described.

4. In combination a post or pillar, a spring-sleeve mounted thereon, a guide coöperating with the post or pillar and sleeve, and a spring carried by the sleeve and supporting the guide, substantially as described.

5. In combination a spring-supported cradle, a mantle-carrier, springs and guides for connecting the carrier and cradle, a flexible connection for supplying gas to the cradle, and flexible connection for supplying gas from the cradle to the carrier, substantially as described.

6. In combination pillars, posts or ways, a cradle, guides and springs for connecting the cradle and pillars, posts or ways, a mantle-carrier, guides and springs for connecting the mantle-carrier and cradle, and flexible connections for supplying gas, substantially as described.

In testimony whereof I have hereunto signed my name in the presence of two witnesses.

SIMEON E. FARRADAY.

Witnesses:
L. R. BERRYMAN,
JAMES A. KELLY.